Patented June 5, 1934

1,961,990

UNITED STATES PATENT OFFICE 1,961,990

MALTING APPARATUS

Oliver Sleeman, Eastington, England

Application November 19, 1929, Serial No. 408,346
In Great Britain November 19, 1929

5 Claims. (Cl. 195—21)

This invention relates to the manufacture of malt and has for its object the provision of a new and improved process whereby malt may be manufactured in a more effective and economical manner than heretofore and whereby the grain employed may be such cereals as maize, wheat, oats, rye, beans, and peas, which provide high digestive and nutritive malt, but which it has hitherto not been found possible to malt owing to the fact that (unlike barley) the acrospires are unprotected and get broken when the grain is turned on the malting floors.

Figure 1:
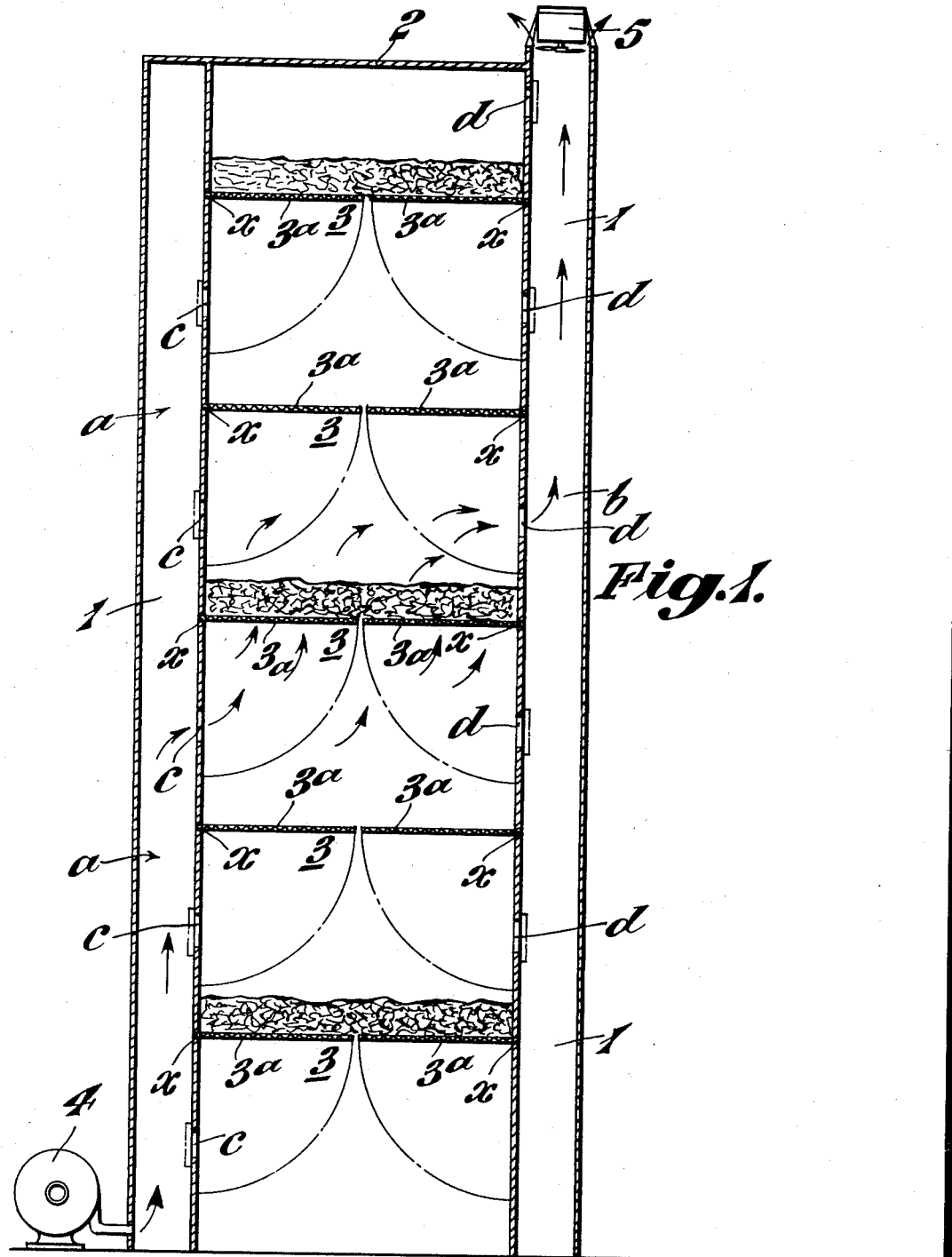
Figure 2:
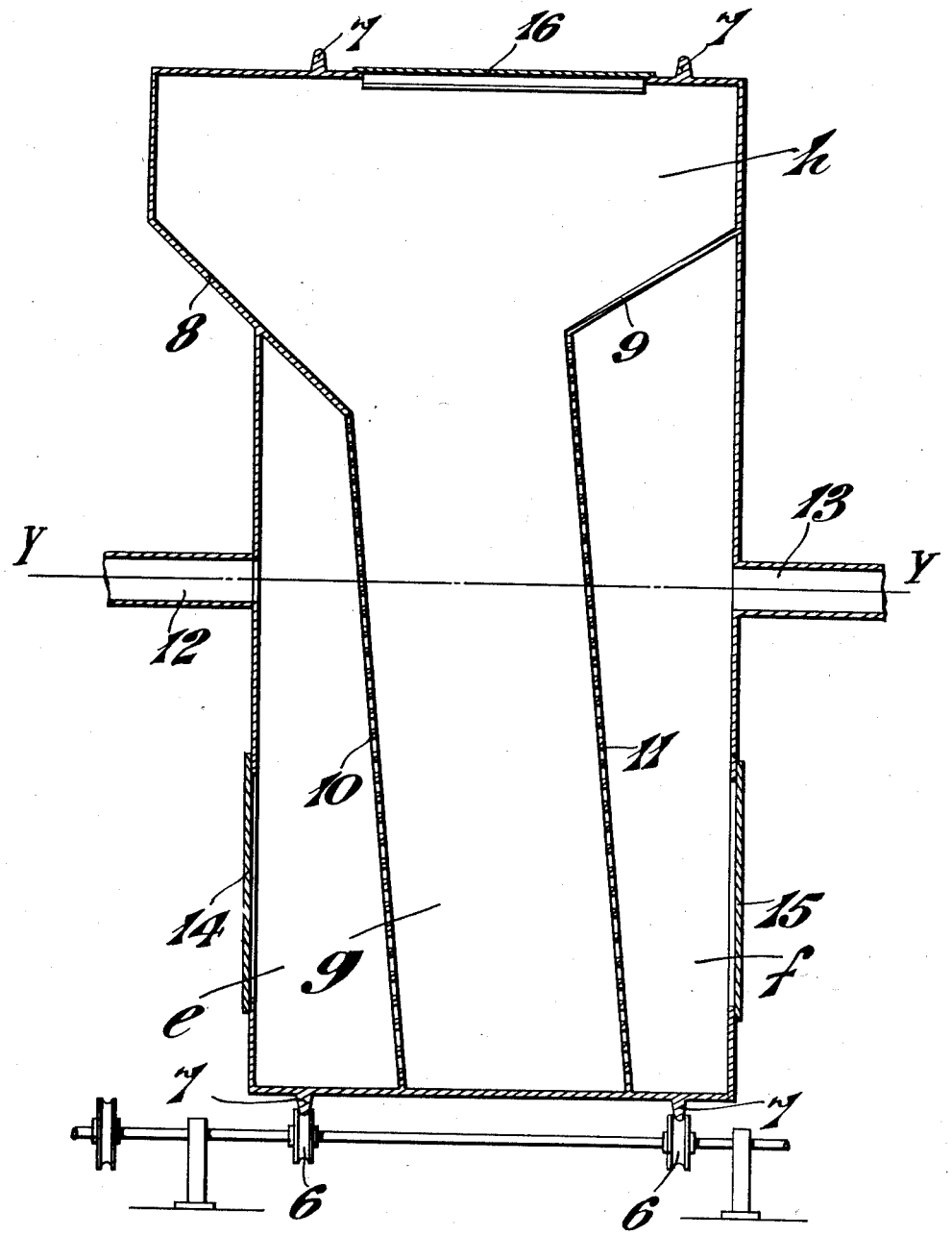

In order that the invention may be the more clearly understood, two methods in accordance therewith, together with the apparatus employed in carrying said methods out, will now be described, reference being made to the accompanying drawings wherein Figure 1 is a sectional elevation, partly diagrammatic of one of said apparatus; and Figure 2 is a similar view of the other.

Referring first to Figure 1, the same illustrates a structure of considerable height compared with its cross sectional area, said structure having four vertical walls 1 and a roof 2 and being divided into a number of compartments by means of, say five, more or less, superimposed horizontal floors 3 constructed of perforated metal, woven wire, or any material giving free passage to air, but not to grain. These floors 3 are preferably four or five feet apart.

Each of these floors is divided into sections $3a$ of an area convenient for manipulation. In the drawings two sections are shown to each floor but more may be provided if convenient. These sections are hinged about axis $x$ and each is normally retained at its horizontal position by means of a suitable catch fastening (not shown); when said fastening is released, said section opens slowly thereby permitting any material lying upon it to drop on the floor next below it. For the purpose of this disclosure and for an understanding of the invention by one skilled in the art, it is believed unnecessary to furnish illustration of the details of construction, since horizontally positioned partitions for the same general purpose and mechanism for operating them are known in the art and an example of such door is shown in U. S. Patent 993,027 of July 18, 1911. When emptied, each section may be returned to its original position and again secured by said catch or fastening. The slow lowering of these sections may be effected by means of a mechanical appliance similar to that for slowly closing the doors of a room. The slow, gradual lowering of the sections tends to distribute the grain more evenly on the floor below, but in some cases the grain on said floor may be leveled by hand labor, or by any known mechanical appliance.

An opposite pair of the vertical walls 1 are made hollow as shown and the spaces $a$ and $b$ within these walls serve respectively as inlet and outlet passages for air passing through the grain on one or more of the floors. Thus openings $c$ are provided between the spaces $a$ and each of the compartments, and openings $d$ are provided between the space $b$ and each of the compartments. A blower 4 is provided for blowing air into the space $a$ at the lower end, and a fan 5 is provided for drawing air out of the space $b$ at the upper end. The openings $c$ and $d$ may each be opened or closed at will and it will be seen that when the blower and fan are in operation it is possible by opening the opening $c$ communicating with one compartment and the opening $d$ communicating with the compartment next above it, to pass a stream of air through the floor between said compartments and the grain upon said floor as indicated in the drawings, in the third compartment. The means for opening and closing the openings may comprise a damper of simple construction and operation such, for instance, as is disclosed in U. S. Patent 1,105,366 of July 28, 1914.

Means are provided whereby all the air passed by the blower is first purified and brought to any selected degree of temperature and humidity, and the amount of air supplied to any compartment may be varied by varying the degree to which the openings $c$ and $d$ are opened.

It is sometimes necessary to sprinkle the malt on the upper floor rather copiously with water; for this purpose water sprinklers are provided above each of the upper floors, and beneath each of these floors a drip trap is located to catch and carry any drips of surplus water that may drop from the upper floor and prevent it falling on the floor beneath. These drip trays are mounted on removable runners so as to be capable of traveling along and catching the drips as the sprinklers discharge the water on the floors above.

In operation, soaked or steeped grain is supplied to the top floor where it is permitted to germinate for one or more days, its temperature and condition being controlled and adjusted by means of the quality, condition and volume of air passed through it from and to the respective spaces $a$ and $b$.

When it is necessary to stir, move or separate the germinating grain, the fastening of the hinged sections 3a of the said top floor are released, so that said sections slowly open and the said grain is dropped gently to the floor next below, the vacated sections being raised and secured in their original positions ready for other loads of grain. In a similar manner, the germinating grain is passed down from floor to floor in succession being treated and aerated on each floor in turn in manner such as its condition may from time to time require until it reaches the bottom floor where it is allowed to rest until it reaches its final state. It is then passed to a drying machine or kiln for the ordinary process of drying and curing. In practice, the malt requires only occasional aeration and it need never be necessary to aerate more than one layer at a time.

It will be clear that the apparatus described may be varied to a considerable extent without departing from the scope of the invention as defined in the appended claims. For example, the arrangement of the inlet and outlet passages may be varied. Moreover, in any case, means should be provided whereby the direction of flow may be reversed when required so as to flow from the space b to the space a.

Referring now to Figure 2, this shows an arrangement in which the grain instead of being made to fall from one germinating compartment to the next is made to fall from a germinating chamber into a dispersing chamber and back again into the same germinating chamber. Thus a container is provided which is of generally cylindrical form with respect to an axis Y—Y and this container is adapted to be rotated about the said axis by means of rotating pulley wheels 6 in driving engagement with flanges 7 mounted on the circumferential periphery of said container. The container is divided by means of imperforate partitions 8 and 9 and perforate partitions 10 and 11 into three separate compartments as shown. The two outer compartments e and f constitute respective air spaces and the inner compartment comprises a germinating chamber g and a dispersing chamber h in free communication with one another. As will be clear from the drawings, all four partitions are inclined out of the vertical with respect to the plane of rotation, the partitions 8 and 9 being inclined downwardly towards one another so that said dispersing chamber is of hopper-like formation and the partitions 10 and 11 being parallel and extending downwardly from the lower edges of the respective partitions 8 and 9. As will be seen, the upper edges of the partitions 8 and 9 meet the ends of the container. The remaining edges of both pairs of partitions run around the periphery of the container so that the same is completely divided into three compartments as above stated.

Coaxially with the axis Y—Y, are two air pipes 12 and 13 leading into the respective air spaces as shown and adapted to be supplied from respective blowers or fans not shown.

Doors 14 and 15 are provided whereby said air spaces may communicate with the outer atmosphere and a door 16 is provided whereby the grain may be fed into the dispersing and germinating chambers.

In operation, the grain is fed through the door 16 into the germinating chamber g after which the doors 14 and 15 are opened and the whole container is placed in a tank of water. Access of the water to the grain is given by way of said doors and the perforations in the partitions 10 and 11 and the grain is accordingly steeped. After the grain is sufficiently steeped, either the container is removed from the tank and the grain permitted to germinate in the germinating chamber g or the grain is removed from the container and permitted to germinate in the germinating chamber of another container. During the germinating process when it is required to aerate the germinating grain, air of regulated humidity and temperature is blown through one or other of the pipes 12 and 13, the door 15 or 14 of the opposite air space being open to permit of the escape of the surplus air and gases. It will be seen that as in the preceding embodiment the direction of flow of the air may be reversed when required. When it is required to turn the grain over during the germinating process, say every one or two days, the whole container is rotated slowly once about the axis Y—Y, this causing the grain to fall from the germinating chamber to the dispersing chamber and back to the germinating chamber. It will be seen that owing to the partitions 10 and 11 being inclined the grain will turn over the more completely and in this connection it is important that the line of junction between plate 8 and the partition 10 should be considerably lower than that between the plate 9 and the partition 11 so that the grain on the right hand side of the germinating chamber will fall before that on the left hand side and the grain will be the better interchanged from side to side of the germinating chamber. For this reason, the plate 12 is preferably more inclined to the horizontal than the plate 13. The thorough turning over of the grain will in some cases be further assisted by making the partitions 12 and 13 corrugated as well as perforated.

The embodiment of the invention as shown in Figure 2 is not so suitable as that of Figure 1 for the treatment of the pulse cereals such as beans, peas, and lentils, which have very tender acrospires as it will be clear that the turning over operation in the former case will involve the greater risk of breaking of the acrospires. When grain of this character therefore is to be malted, the steeping operation may be first effected in the structure of Figure 2 after which the grain is germinated in the structure of Figure 1.

I claim:

1. Apparatus for manufacturing malt comprising a plurality of compartments at different elevations having movable malt supporting elements adapted to be opened or closed whereby when opened germinating grain may be stirred by dropping it by gravity from one compartment to another, two air chambers and means whereby either chamber may serve as a supply chamber and the other as an exhaust chamber for passing air through the compartments.

2. A malt house comprising an upright stationary chamber, a plurality of perforated hingedly supported floors extending completely across said chamber so as to divide it into superimposed compartments, said floors being operable to open selectively to permit the escape of grain therethrough whereby grain on any desired floor may be stirred by dropping it gently on to the floor beneath, and means whereby air may be admitted into any compartment and exhausted from any compartment so that a current of air may be passed through the perforations of any floor and a layer of grain resting thereupon.

3. A malt house comprising an upright stationary chamber, a plurality of perforated hingedly supported floors extending completely across said chamber so as to divide it into superimposed compartments, said floors being operable to open selectively to permit the escape of grain therethrough whereby grain on any desired floor may be stirred by dropping it gently on to the floor beneath, an upright air inlet trunk and an upright air outlet trunk each having individually controllable openings communicating with the respective compartments.

4. A malt house comprising an upright stationary chamber, a plurality of perforated hingedly supported floors extending completely across said chamber so as to divide it into superimposed compartments, said floors being operable to open selectively to permit the escape of grain therethrough whereby grain on any desired floor may be stirred by dropping it gently on to the floor beneath, two upright air trunks each having individually controllable openings communicating with the respective compartments, and means whereby either trunk may serve as an inlet trunk while the other serves as an outlet trunk.

5. A malt house comprising an upright stationary chamber, a plurality of perforated floors, each of which consists of a pair of hinged sections and extends completely across the said chamber so as to divide it into superimposed compartments whereby the opening of any one of said sections slowly may distribute grain evenly and without maltreatment on to the floor beneath, and means whereby air may be admitted into any compartment and exhausted from any compartment so that a current of air may be passed through the perforations of any floor and a layer of grain resting thereon.

OLIVER SLEEMAN.